A. ASCHENBRENNER
DOUBLE WALLED VESSEL.
APPLICATION FILED JUNE 27, 1908.

912,986.

Patented Feb. 23, 1909.

Witnesses:
M. Gfeller
F. George Barry

Inventor:
Albert Aschenbrenner
by attorneys

UNITED STATES PATENT OFFICE.

ALBERT ASCHENBRENNER, OF BERLIN, GERMANY, ASSIGNOR TO AMERICAN THERMOS BOTTLE COMPANY, OF BROOKLYN, NEW YORK.

DOUBLE-WALLED VESSEL.

No. 912,986.      Specification of Letters Patent.      Patented Feb. 23, 1909.

Application filed June 27, 1908. Serial No. 440,652.

*To all whom it may concern:*

Be it known that I, ALBERT ASCHENBRENNER, a subject of the German Emperor, and resident of Berlin, Germany, have invented a new and useful Improvement in Double-Walled Vessels, of which the following is a specification.

This invention relates to a double walled vessel comprising inner and outer walls united with each other only at the mouth of the vessel and inclosing between them a rarefied space, the object being to locate the sealing teat or teats at the neck of the bottle, preferably uprising from the shoulder thereof so that the said sealing teat or teats may be easily protected from breakage which so often happens where the teats are located at the bottom of the vessel.

Figure 1:
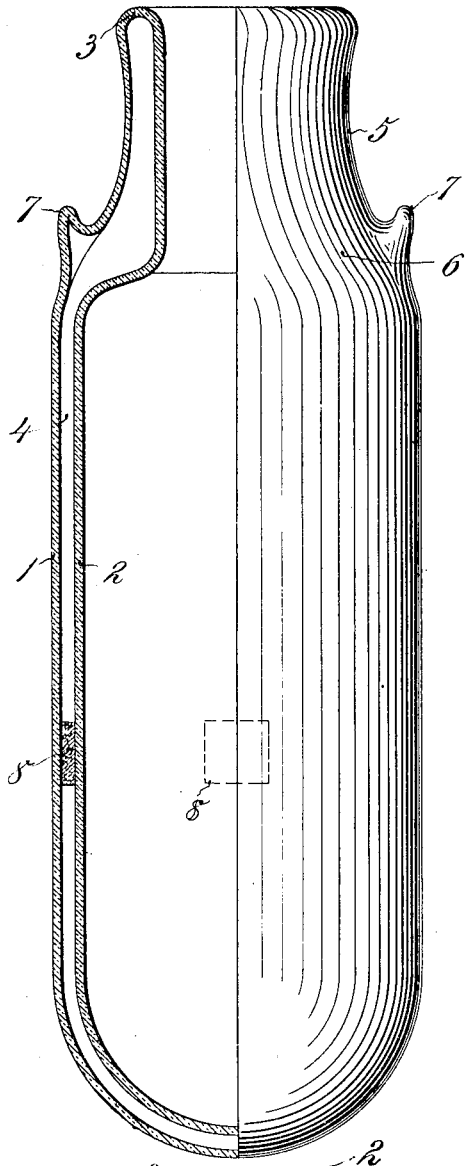
Figure 2:
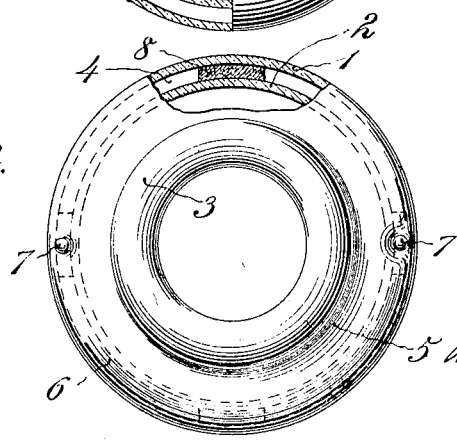

In the accompanying drawings, Figure 1 represents the improved double walled vessel half in side elevation and half in vertical central section, and Fig. 2 is a top plan view of the vessel, a portion of the same being broken away.

The vessel is of glass in bottle form or contracted toward the mouth. The outer wall 1 is united to the inner wall 2 by fusing only at the mouth, and in the rarefied space 4 between said walls are spacing pads 8.

Upon the contracted portion of the outer wall, and preferably at or near a circumferential line passing through the point 6, where the vessel begins to contract to form the neck J, I form one or more upwardly turned tubular projections 7 which, during the manufacture of the vessel, are to be used as teats for the attachment of the air pump connection for the exhaustion of said rarefied space, and for the introduction of the usual silvering liquid therein, but which in the completed vessel are closed by sealing, as shown in the drawing. When the vessel is to be re-exhausted, the closed end of one or the other of said projections is usually broken and the connections from the air pump again attached thereto. Hitherto, these projections have been formed on the bottom of the outer vessel or on the non-contracted portion, so that they extend outwardly beyond the bounding circumference. This renders them liable to breakage during the handling and transportation of the vessel. By locating said projections at the contracted portion of the outer wall, so that they lie wholly within the circumference bounding the non-contracted portion thereof, said non-contracted portion forms a guard for them; while, by turning them upward, they move freely in and out of the sockets, which they themselves form in the packing material ordinarily interposed between a vessel of this kind and its inclosing case, instead of engaging with said sockets and so becoming cracked or broken, which commonly happens when said projections extend laterally from the outer vessel, and which results in a destruction of the vacuum present.

I claim:

1. In combination with a glass vacuum vessel, double walled and contracted toward the mouth, and on the contracted portion of the outer wall thereof, a closed tubular projection lying wholly within the circumference bounding the non-contracted portion of said wall.

2. In combination with a glass vacuum vessel, double walled and contracted toward the mouth, and on the contracted portion of the outer wall thereof, an upwardly extending closed tubular projection lying wholly within the circumference bounding the non-contracted portion of said wall.

3. In combination with a glass vacuum vessel, double walled and contracted toward the mouth, and on the contracted portion of the outer wall thereof, a plurality of upwardly extending closed tubular projections lying wholly within the circumference line bounding the non-contracted portion of said wall.

In testimony, that I claim the foregoing as my invention, I have signed my name in presence of two witnesses, this eleventh day of June 1908.

ALBERT ASCHENBRENNER.

Witnesses:
  HEINRICH RAUCHHOLZ,
  HENRY HASPER.